United States Patent [19]

Geffen

[11] Patent Number: 5,669,494
[45] Date of Patent: Sep. 23, 1997

[54] STORAGE CAROUSEL FOR COMPACT DISKS AND THE LIKE

[75] Inventor: Benjamin Geffen, San Francisco, Calif.

[73] Assignee: Full Circle Company, San Francisco, Calif.

[21] Appl. No.: 289,194

[22] Filed: Aug. 11, 1994

[51] Int. Cl.⁶ .................... B65D 85/57; B65D 85/575
[52] U.S. Cl. ............... 206/308.1; 206/309; 206/387.15; 211/40; 211/41; 211/163
[58] Field of Search ............. 206/308.1, 309–311, 206/499, 307.1; 211/40, 41, 78, 163; 312/9.46; 40/331

[56] References Cited

U.S. PATENT DOCUMENTS

| | | | |
|---|---|---|---|
| 3,156,058 | 11/1964 | Ruskin et al. | 40/331 |
| 3,170,741 | 2/1965 | Richards, Jr. | 312/9.46 |
| 3,608,739 | 9/1971 | Duboff | 211/40 |
| 3,736,036 | 5/1973 | Mathus | 312/9.46 |
| 3,868,916 | 3/1975 | Ohlson | 211/163 |
| 3,889,817 | 6/1975 | Berkman | 211/163 |
| 3,992,068 | 11/1976 | Galton | 211/78 |
| 4,014,437 | 3/1977 | Rumble | 211/78 |
| 4,057,305 | 11/1977 | Zdeblick | 312/11 |
| 4,269,124 | 5/1981 | Rosenthal et al. | 211/163 |
| 5,031,779 | 7/1991 | Szenay | 211/40 |
| 5,172,817 | 12/1992 | Gross | 211/40 |
| 5,176,264 | 1/1993 | Depalma | 211/40 |
| 5,197,600 | 3/1993 | Garcia | 206/444 |
| 5,232,089 | 8/1993 | Kim | 206/309 |

Primary Examiner—Jimmy G. Foster
Attorney, Agent, or Firm—Fish & Neave

[57] ABSTRACT

A novel and improved rotatable CD and other cartridge storage carousel having a cylindrical shape that rotates about a vertical axis to display the CDs or other cartridges in a horizontal plane for easy identification and selective removal by the user. The carousel consists of a number of tiers formed by spacers each containing several storage compartments; the tiers are mounted on a rotating base turntable. The depth of each spacer and tier may be varied to allow for storage of varying size cartridges.

18 Claims, 2 Drawing Sheets

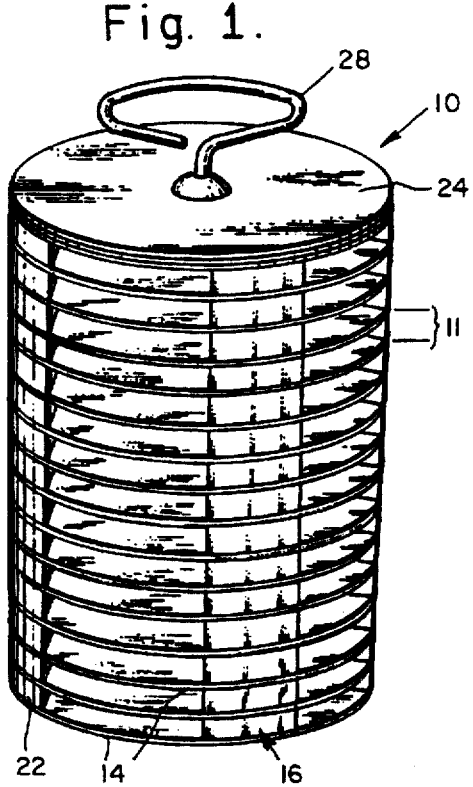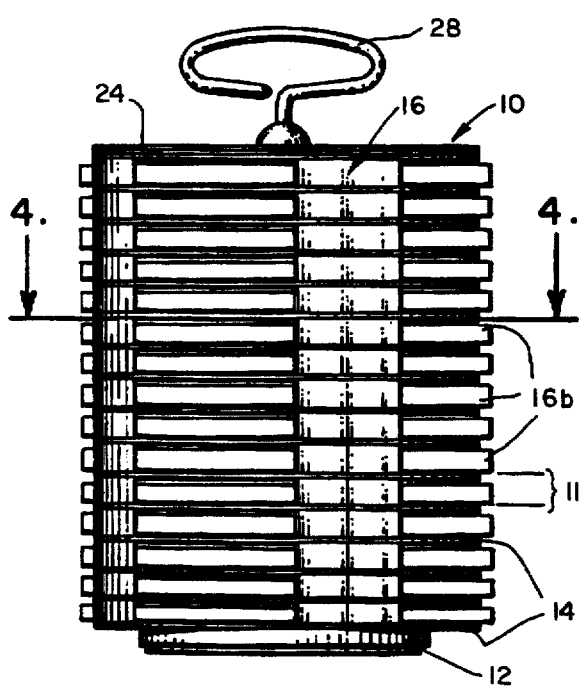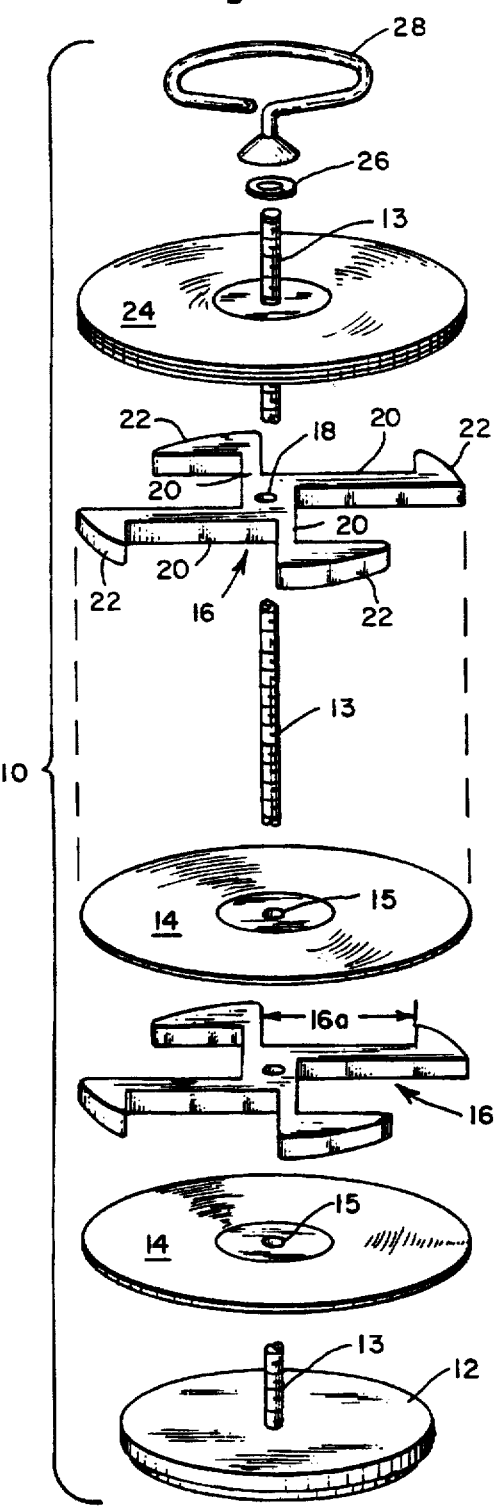

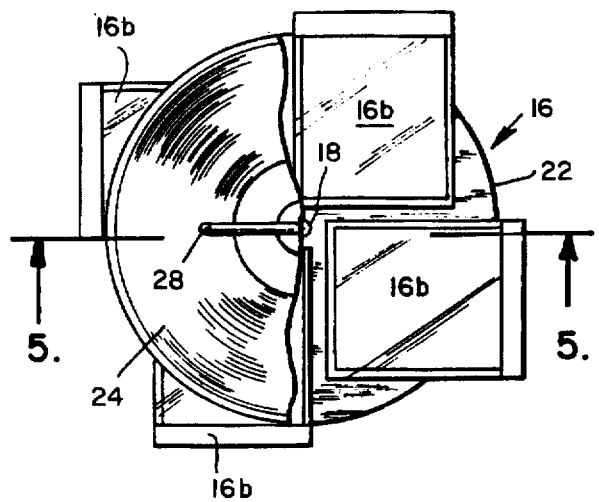
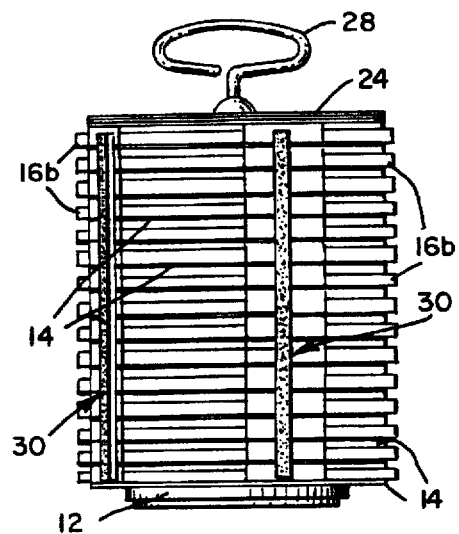
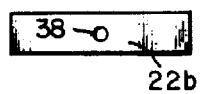
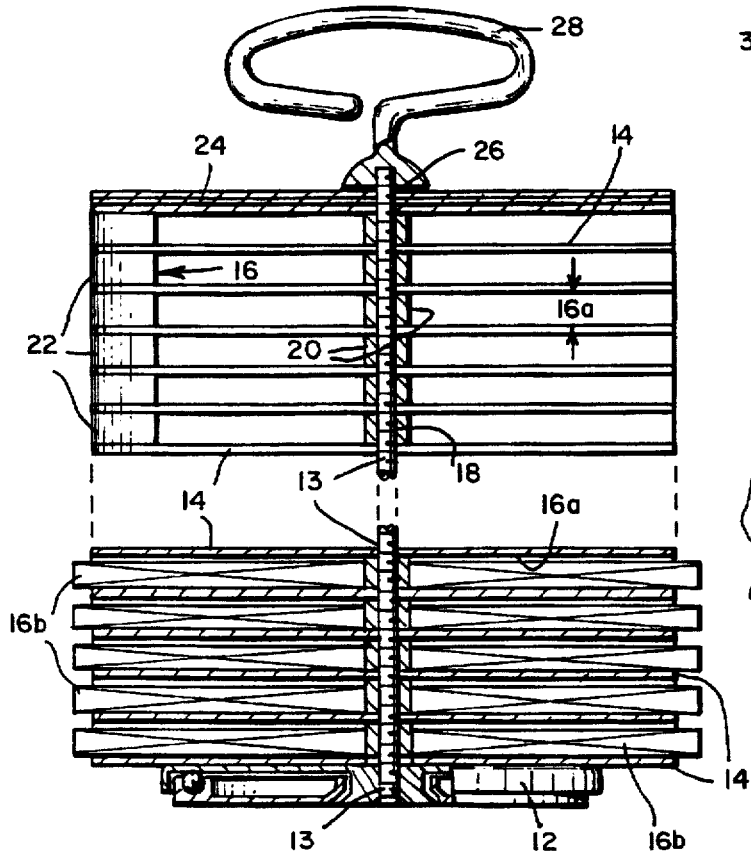
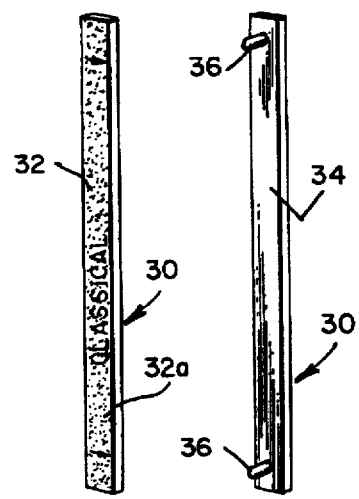
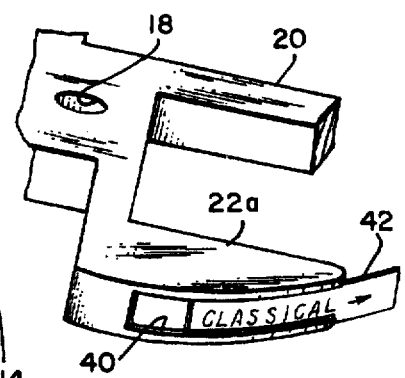

5,669,494

STORAGE CAROUSEL FOR COMPACT DISKS AND THE LIKE

BACKGROUND

1. Field of the Invention

This invention relates generally to apparatus for organizing and storing audio compact disk recordings (CDs) and other types of storage cartridges, such as computer CD-ROMs and audio and video cassette tapes. It specifically relates to a novel and improved rotatable CD and other cartridge storage apparatus that is cylindrical in shape and that rotates about a vertical axis to display the CDs or other cartridges in a horizontal plane for easy identification and selection by the user.

2. Description of the Prior Art

In the past decade, the CD has become the most popular medium in use for storing and playing back recorded audio programming. The CD is also widely used as a medium for inputting, storing, and reading computer data.

The CD itself consists of a plastic disk with metallic surfaces. On these surfaces audio information such as music is digitally encoded by a laser. Such a CD may then be inserted in a player that can decode the information with a laser, and playback the music in analog form on audio amplifier equipment.

Audio CDs are universally sold by retailers, and stored by users, in standardized plastic cases known as "jewel boxes". The jewel box has two covers that are hinged together with a spine in a manner similar to the spine of a book. This allows the box to be opened and closed around 1 or more CDs to protect it from damage and dust. The contents of the audio programming contained in a CD is printed on the front cover and on the spine. A standard jewel box generally measures approximately 5½ inches long, 5 inches wide, and ⅜ inches thick. However, if a jewel box contains more than 1 CD, the jewel box will be thicker. For example, a jewel box that holds 4 CDs will be approximately 1 inch thick. Jewel boxes that hold multiple CDs are known as "boxed sets".

When a CD user has acquired a large quantity of CDs, the user commonly stores the CDs in a rack designed to store, organize, and display CD jewel boxes. Several types of racks have been provided in prior art to store CD jewel boxes and similar containers during the period when the jewel boxes or other containers are not being used.

One type of storage rack is stationary in operation. For example, U.S. Pat. No. 5,172,817 to Gross (1992) discloses a stationary, flat CD rack that displays the CD front cover to the user. However, it will be noted that this rack requires considerable wall area to store relatively few CDs. U.S. Pat. No. 5,232,089 to Kim (1993) also discloses a stationary structure CD rack that displays the front cover of the CD to the user. However, the drawbacks of the CD rack in Kim are that it can display only one CD to the user at any particular time, and the user must "flip through" many CD jewel boxes to view all of the available choices.

In contrast to stationary racks, the prior art also reveals several storage devices that are designed to rotate in operation, in order to conserve space and to allow the user to access more CDs in less time. The first kind of rotatable storage rack revolves around a horizontal axis. For example, U.S. Pat. No. 5,197,600 to Garcia (1993) and U.S. Pat. No. 4,057,305 to Zdeblick (1977) both show of horizontal-axis storage rack. These racks have the advantage that they present the spine of the storage container in a horizontal plane for ease of reading by the user. However, they both have the disadvantage that they require a special groove or mechanical device such as a clip to keep the CD jewel box from falling out when the box reaches the bottom of the rotation of the storage rack. These racks have the further disadvantage that they do not utilize all of the storage space in the cylinder that forms the shape of the rack. They waste storage space because, as viewed from the side, the jewel boxes are arrayed in the rack like the spokes in a wheel, and the empty space between each "spoke" is not utilized for storage.

The second type of storage rack disclosed by the prior art is a type that rotates on a vertical axis. For example, vertically rotatable storage devices are disclosed in U.S. Pat. No. 5,176,264 to DePalma (1993), U.S. Pat. No. 5,031,779 to Szenay et al. (1991), and U.S. Pat. No. 3,608,739 to Duboff (1971). These storage racks all store more CDs in less space than stationary racks, and are also stackable to enable the user to expand storage space. However, all of these storage racks have the disadvantages that (1) the stored CDs are oriented in a vertical plane that makes the label on the jewel box spine hard to read, and (2) like the horizontally rotatable storage racks, they are arrayed like the spokes of a wheel, and have unused storage space between the "spokes".

As noted earlier, one of the features of the CD jewel box is that it comes in various widths: a width for the size that contains a single CD, and greater widths for jewel boxes that contain multiple CDs. All of the prior art in this field, including the prior art discussed above, have a major disadvantage. This disadvantage common to all of the prior racks is that each of their compartments for holding CD jewel boxes are uniform in size, so that the racks can only accommodate the single-CD jewel boxes. None of the prior arts' compartments are capable of, or adaptable to, accommodating jewel boxes that contain multiple CDs. Furthermore, no prior art shows the capability to accommodate CD jewel boxes and other types of cartridges at the same time.

OBJECTS AND ADVANTAGES

Accordingly, several objects and advantages of the preferred embodiment of the present invention are to provide:

(a) A method of storing a large number of CD jewel boxes and other cartridges that efficiently utilizes storage space to take advantage of the small size of the CD.

(b) A method of storing CD jewel boxes and other cartridges in which the storage device rotates about a vertical axis, and in which the spine of the CD jewel box or other cartridge is displayed in a horizontal orientation, so that the title labeled on the spine may be easily read.

(c) A method of storing CD jewel boxes and other cartridges that provides secure storage for the box or cartridge at the same time it facilitates easy removal of the box or cartridge by the user.

(d) A method of storing CD jewel boxes and other cartridges on separate tiers with individual compartments for each box or cartridge, rather than stacking them one directly on the other.

(e) A method of storing CD jewel boxes and other cartridges that allows partial removal of the box or cartridge so the user may examine the face portion of the box or cartridge, which contains the title and pictorial artwork contained in the CD box or cartridge.

(f) An attractive storage device that recognizes earlier audio reproduction technology by incorporating genuine or fabricated long playing phonographic records (LP)s as part of its physical structure.

(g) A CD jewel box storage device that has the capability of storing CD jewel boxes of various sizes by providing a variety of widths in its storage compartments.

(h) A storage device for CD jewel boxes and other cartridges that may be adjusted to various overall heights, enabling the user to add or delete storage space.

(i) A storage device for CD jewel boxes and other cartridges that is easy and economical to use, manufacture, and assemble.

(j) A storage device that provides environmental awareness, in that it is obviously constructed from the recycled LP phonograph records.

(k) A storage device that allows the user to organize the CD jewel boxes and other cartridges in any desired arrangement or design, such as a "spiral" or a "staircase".

(l) A vertically rotatable storage device for CD jewel boxes and other cartridges that contains a means of securing the jewel box or cartridge to prevent the jewel box or cartridge from falling out due to centrifugal force when the device is rotated.

(m) A storage device that contains a means of storing audio and video cassette tapes and other cartridges simultaneously with the storage of CD jewel boxes.

The objects and advantages of an alternative embodiment of the present invention, an unassembled kit version, are to provide all of the objects and advantages of the preferred embodiment stated above, and at the same time to provide:

(n) The user with the capability of incorporating into the storage device the user's own used LP phonograph records, including LPs that may be the user's mementos or souvenirs.

(o) An unassembled storage device for CD jewel boxes and other cartridges that will fit in a compact package to minimize costs of packaging, handling, distribution, freight, storage, and retail display.

In addition to those listed above, the present invention has other objects and features of advantage that will become apparent from and that are set forth in more detail in the accompanying drawings, descriptive matter, and claims.

BRIEF DESCRIPTION OF THE DRAWING FIGURES

FIG. 1 is a perspective view of a storage carousel that is the preferred embodiment of the present invention.

FIG. 2 is a side elevational view of the storage carousel with its storage compartments holding a plurality of CD jewel boxes.

FIG. 3 is an exploded perspective view of the components of the storage carousel.

FIG. 4 is a top plan, partial cross-sectional view taken along lines 4—4 in FIG. 2 with a portion broken away to reveal otherwise hidden stored CD jewel boxes.

FIG. 5 is a side elevational view of the storage carousel in partial cross-section taken along lines 5—5 in FIG. 4, the bottom portion depicting a cross-section of the CD jewel boxes stored in the carousel compartments, and also depicting a base turntable.

FIG. 6 is a side elevational view of the storage carousel with its storage compartments holding a plurality of CD jewel boxes, and depicts an alternate configuration of the storage carousel.

FIG. 7 is a front perspective view of a classification labelling bar for use as shown on the alternate storage carousel configuration shown in FIG. 6.

FIG. 8 is a rear perspective view of the classification labelling bar shown in FIG. 7.

FIG. 9 is a partial perspective view of an alternate embodiment of the arcuate surface of the spacer component depicted in the storage carousel in FIG. 3, and shows a notch for holding an identification label.

FIG. 10 is a side elevational view of another alternate embodiment of the arcuate surface of the spacer component depicted in the storage carousel in FIG. 3, and shows a hole for securing a labelling/reinforcing bar.

LIST OF REFERENCE NUMERALS IN DRAWINGS

The same reference numerals refer to the same parts throughout the various views of the drawings, as follows:

10 storage carousel for compact disk jewel boxes and other cartridges
11 tier
12 base turntable
13 vertical rod
14 divider platter
15 central hole in 14
16 spacer
16a a storage compartment formed by 16
16b CD stored in 16a
18 central hole in 18
20 radiating arm of 16
22 outer, arcuate surface of 16
22a a alternate outer, arcuate surface of 16
22b b second alternate outer, arcuate surface of 16
24 top platter
26 locking washer
28 handle
30 labelling and reinforcing bar
32 outer surface of 30
34 inner surface of 30
36 attachment peg
38 peg hole
40 classification tag slot
42 classification tag

DETAILED DESCRIPTION OF THE INVENTION

FIG. 1 shows generally by numeral 10 a perspective view of a basic version of a carousel apparatus for storing and displaying a plurality of compact disks (CD) jewel boxes or other types of music media and computer cartridges that is the preferred embodiment of the present invention. The carousel 10 illustrated in FIG. 1 is comprised of fifteen tiers or levels vertically spaced or stacked one upon another; each tier comprises a plurality of storage areas, and a single such tier is indicated in FIG. 1 by numeral 11. Each storage tier is formed by a spacer 16 sandwiched between two divider platters 14. As is best viewed in FIG. 3, each divider platter 14 and each spacer 16 are aligned about a vertical rod 13, and all of the tiers in the carousel 10 can be turned about the axis created by the vertical rod 13. Also shown in FIG. 1 is a top platter 24, which serves as a cover for all of the storage tiers of the carousel 10, and a handle 28, which enables a consumer to carry the entire carousel 10 and its contents from one location to another.

Turning to FIG. 2, a side elevational view of the storage carousel shows a base turntable 12, that allows the carousel to rotate when the handle 28 is turned by the consumer. As is best shown in the cross-sectional view of FIG. 5, the base turntable 12 comprises two circular plates, the top plate of which is coupled to the lower plate, with circular ball bearing means mounted between the plates to allow the top to rotate with respect to the lower plate. Base turntables as 12 are conventionally available devices. FIG. 2 also shows a side view of the top platter 24, which may consist, for example, of three individual platter dividers as 14. FIG. 2 further shows a side view of the carousel storage compartments holding a plurality of CD jewel boxes or other cartridges 16b. It should be noted that cartridges 16b are presented in a horizontal plane to allow the user to easily read the spine of the cartridge.

The exploded perspective view of FIG. 3 best shows the configuration of all of the components of the storage carousel 10. Support for the carousel 10 is provided by the base turntable 12. As shown in FIG. 3 and FIG. 5, a solid rod 13 extends vertically upward from a central aperture in base turntable 12. The preferred fabrication for vertical rod 13 is metal, although it may be fabricated from hardened plastic. To secure it in a vertical position, the externally threaded bottom of vertical rod 13 is threaded into the internally threaded aperture of turntable 12. A central hole 15 in the first divider platter 14 is then placed over the vertical rod 13 and slid down immediately adjacent to base turntable 12. The preferred embodiment of divider platter 14 is a LP phonograph record album; however divider platter 14 may be any circular platter fabricated from hardened plastic in the size of a phonograph record album.

The next component shown in FIG. 3 is the spacer 16. The spacer 16 has a depth that is the same depth of the CD jewel box or other cartridge that is desired to be stored. The spacer is formed, preferably of hardened plastic, in a shape that creates a plurality of three-sided storage compartments 16a. The example of the spacer 16 in FIGS. 3 and 4 contains four storage compartments 16a. The illustrated spacer 16 comprises three segments: a central rectangular box segment with a central hole 18, radiating arm segments 20, and outer segments each ending in an arcuate surface 22. Note that, as shown in FIG. 4, the outer, arcuate surface 22 is concentric and flush with the outer edge of the divider platters 14. Thus, each spacer 16 has the same diameter as each divider platter 14. To form storage compartments 16a as shown in FIGS. 3 and 5, the central hole 18 in the first spacer 16 is placed over the vertical rod 13 and slid down immediately adjacent to and on top of the first divider platter 14, and a second divider platter 14 is slid down on top of the first spacer 16. The storage carousel 10 is therefore assembled into tiers 11 by alternating divider platters 14 and spacers 16. Thus, each storage compartment 16a is bounded on five sides by divider platters 14 on top and bottom and by the three sides formed by the spacer 16. A CD or other cartridge 16b is stored by insertion into the open side of the storage compartment 16a.

The top tier of storage carousel 10 is capped by a top platter 24, which in the example shown in FIGS. 1, 2, and 3 is comprised of three divider platters 14 bonded together. Then a locking washer 26 is slid over the vertical rod 13, which is externally threaded at the top. The internal threads of the handle 28 are then threadably engaged with the external threads at the top end of the rod 13, as shown in FIG. 5. When handle 28 is tightened in this manner, handle 28, lockwasher 26, the top platter 24, vertical rod 13, all spacers 16, all divider platters 14, and any stored CD or other cartridges 16b are all clamped securely and immovably relative to one another; the rotation of the carousel is allowed by the relative rotation of the plates in the turntable 12. It should also be noted from FIG. 3 that the number of tiers 11 that may fit in the storage carousel 10 is controlled by the length of vertical rod 13. Consequently the storage capacity of the storage carousel 10 may be varied by providing varying lengths of vertical rod 13, and extra spacers 16 and divider platters 14.

As shown in FIG. 3 and explained above, the entire storage carousel can be assembled and disassembled very rapidly. This fact allows the user to easily rotate the spacers 16 about the axis of the vertical rod 13 and thus to organize the CDs in any desired arrangement or design, such as a "spiral" or a "staircase". It also allows the user to incorporate into the storage device the user's own used LP phonograph records or other platters as divider platters 14. Furthermore, an unassembled CD carousel 10 will fit into a compact package to minimize costs of packaging, handling, distribution, freight, storage, and retail display.

As best seen in FIG. 4, the compartments 16a in the spacer 16 are designed so that the cartridges, in this illustration CD jewel boxes 16b, fit snugly in the compartment. FIG. 4 also shows that the hinged end of the CD jewel boxes 16b protrudes beyond the edges of the divider platter 14 and the circle formed by spacer's 16 outer, arcuate surface 22. This configuration allows the user to grasp the end of the CD jewel box 16b and remove it from the storage carousel 10.

FIG. 5 is a side elevational view of the storage carousel in partial cross-section taken along lines 5—5 in FIG. 4. The top portion of FIG. 5 illustrates a cross-section of the internally threaded bore of handle 28 tightened on the externally threaded end of vertical rod 13. The top portion of FIG. 5 also shows the depth of storage compartment 16a, which is the same as the depth of spacer 16, shown at cross section of radial arm 20. Thus, the storage carousel can accommodate varying sizes of CD jewel boxes and other cartridges by having corresponding varying depths and configurations of spacers 16. The bottom portion of FIG. 5 depicts a cross section of CD jewel boxes or other cartridges 16b as they occupy the storage compartments 16a. The bottom portion of FIG. 5 also depicts a cross-section of the ball-bearing base turntable 12 and its accommodation of the threaded bottom end of vertical rod 13.

FIGS. 6, 7, 8, and 10 depict an alternate configuration of the storage carousel in which a three-dimensional labelling and reinforcing bar 30 is added to the storage carousel 10. FIG. 7 shows a front perspective view of the labelling and reinforcing bar 30 and its outer surface 32. The outer surface 32 may be imprinted with a classification label, such as "classical" or "jazz" to identify the contents of that particular row of storage compartments, and may be further identified by a color code. FIG. 8 is a rear perspective view of the labelling and reinforcing bar 30, and its inner surface 34. Located on inner surface 34 are two peg members 36, each of which are designed to fit in a hole 38 in an alternative embodiment of the outer, arcuate surface of spacer 16. FIG. 10 shows this alternate, arcuate, outer surface 22b and its peg hole 38. To utilize labelling and reinforcing bar 30, a spacer with outer surface 22b is used in both the top and bottom tier of carousel 10. As shown in FIG. 6, labelling and reinforcing bar 30 is attached to the outside of a row of spacers by insertion of peg 36 into hole 38 of both the top and bottom spacers 16. As its name implies, labelling and reinforcing bar 30 provides additional stability to the tiers of carousel 10 by providing a secure vertical attachment between the top and bottom spacers 16.

FIG. 9 is a partial perspective view of another alternate embodiment of the outer surface of the spacer component depicted in the storage carousel in FIG. 3. In this embodiment, spacer outer surface 22a has a slot 40 which is designed to hold an identification tag 42, which may be used to label a row of CDs or other cartridges with a category such as "classical" or "jazz". Tag 42 is simply inserted into the open end of slot 40, as shown in FIG. 9.

SUMMARY, RAMIFICATIONS, AND SCOPE

Accordingly, it will be noted that the carousel according to this invention can be used to store CD jewel boxes and other similar cartridges economically, easily, and conveniently. Furthermore, a storage carousel of the configuration of the instant invention:

allows the storage device to rotate about a vertical axis and to display the spine of the CD jewel box or other cartridge in a horizontal orientation, so that the user may easily read the title of the CD jewel box or other cartridge labeled on the spine.

provides a method of storing CD jewel boxes of other cartridges that is secure at the same time it facilitates easy removal of the CD jewel box or other cartridge by the user.

allows addition or deletion of storage space.

provides a method of storing cartridges on separate tiers with individual compartments for each jewel box, rather than stacking them one directly on the other.

allows storage of a large number of CD jewel boxes or other cartridges in a small area.

is an attractive storage device that recognizes earlier audio reproduction technology by incorporating LPs as part of its physical structure.

allows storage of CD jewel boxes and other cartridges of various sizes by providing a variety of widths in its storage compartments.

promotes environmental awareness because it is obviously constructed from recycled LP phonograph records.

allows storage of audio and video cassette tapes and other cartridges simultaneously with the storage of CD jewel boxes.

allows the user to incorporate into the storage device the user's own used LP phonograph records.

may be sold in an unassembled version to decrease costs of packaging, handling, distribution, freight, storage, and retail display.

Although the description above contains many precise specifications, the specifications should not be construed as limiting the scope of the invention, but as merely providing examples of the preferred embodiments of the invention. For example, the spacer 16 may form more storage compartments than the four illustrated in the drawings. It should also be understood that each of the elements described above, or two or more elements together, may also have a useful application in methods other than the types described above.

Thus, the scope of the invention should be determined by the following appended claims, rather than by the examples given in the specification.

What I claim is novel and desired to be protected by letters patent is set forth as follows:

1. Apparatus for storage of boxes comprising:

a base turntable having a central aperture;

extending vertically upward from and attached to said base turntable, an elongated rod for purpose of retaining all parts of said apparatus in place centered around axis of said rod, and stationary relative to said base turntable;

a plurality of substantially identical circular dividers that are LP phonograph record albums, each divider having a central aperture for accommodation of said rod, and each held in place by said rod in planes parallel to and concentrically above said base turntable;

a plurality of spacers, each spacer having a central aperture for accommodation of said rod, each spacer including a plurality of radially outwardly extending walls, each spacer held in place by said rod between said dividers concentrically above said base turntable to define a plurality of storage tiers, each storage tier defining a plurality of compartments;

a handle having a central aperture for the purpose of attaching said handle to a top of said rod and for the purpose of clamping all of said dividers, spacers, and boxes to be stored in stationary position relative to said base turntable.

2. Apparatus as claimed in claim 1 wherein said dividers are fabricated from durable plastic.

3. Apparatus as claimed in claim 1, further including said spacers of a number or variety of depths so that a single said storage apparatus may accommodate storage of multiple CD jewel boxes in each of said compartments.

4. Apparatus as claimed in claim 1, wherein at least one of said plurality of spacers further comprises a notch with means for enclosing classification labels.

5. Apparatus as claimed in claim 1, further including a classification labelling bar with means for attaching said bar to the outer edges of said spacers.

6. Apparatus as claimed in claim 1 wherein said rod has a diameter equal to the diameter of the center aperture of a LP phonograph record album.

7. Apparatus as claimed in claim 1 wherein the length of said rod may be selected to add to or reduce storage capacity of said apparatus.

8. Apparatus as claimed in claim 1 wherein said apparatus may be disassembled to enable a user to insert his own dividers in said apparatus.

9. Apparatus as claimed in claim 1 wherein the apparatus is expandable and modular.

10. Apparatus for storage of CD jewel boxes, audio cassette boxes and video cassette boxes, the apparatus comprising:

a circular base turntable having a central aperture;

a rod extending vertically upward from and attached to the base turntable, the rod stationary relative to said base turntable;

a plurality of substantially identical circular dividers, each one of the plurality of circular dividers having a central aperture for accommodation of the rod, each one of the plurality of dividers disposed on the rod in planes parallel to and concentric with the base turntable;

a plurality of spacers, each one of the plurality of spacers having a central aperture for accommodation of the rod and a plurality of radially outwardly extending walls, each one of the plurality of spacers disposed on the rod between respective ones of the plurality of circular divider platters to define a plurality of compartments, at least one of the plurality of spacers comprising a notch with means for enclosing classification labels; and a handle having means for attaching the handle to a top of said rod and for clamping the pluralities of circular dividers, spacers, and boxes to be stored in stationary position relative to said base turntable.

11. The apparatus as defined in claim 10 wherein the plurality of circular dividers is fabricated from durable plastic.

12. The apparatus as defined in claim 10 wherein the plurality of spacers have different depths.

13. The apparatus as defined in claim 10 further comprising a classification labelling bar having means for attaching the classification bar to outer edges of the plurality of spacers.

14. The apparatus as defined in claim 10 wherein the apparatus has a storage capacity and the rod has length that may be selected to adjust the storage capacity.

15. The apparatus as defined in claim 10 wherein the apparatus is expandable and modular.

16. Apparatus for storage of CD jewel boxes, audio cassette boxes and video cassette boxes, the apparatus comprising:

a circular base turntable having a central aperture;

a rod extending vertically upward from and attached to the base turntable, the rod stationary relative to said base turntable;

a plurality of substantially identical circular dividers, each one of the plurality of circular dividers having a central aperture for accommodation of the rod, each one of the plurality of dividers disposed on the rod in planes parallel to and concentric with the base turntable;

a plurality of spacers, each one of the plurality of spacers having a central aperture for accommodation of the rod and a plurality of radially outwardly extending walls, each one of the plurality of spacers disposed on the rod between respective ones of the plurality of circular divider platters to define a plurality of compartments;

a handle having means for attaching the handle to a top of said rod and for clamping the pluralities of circular dividers, spacers, and boxes to be stored in stationary position relative to said base turntable; and a classification labeling bar having means for attaching the classification labeling bar to the outer edges of the plurality of spacers.

17. The apparatus as defined in claim 16 wherein the plurality of circular dividers are LP phonograph record albums and are fabricated from a durable plastic.

18. The apparatus as defined in claim 16 wherein the apparatus has a storage capacity and the rod has a length that may be selected to adjust the storage capacity.

* * * * *